US006359254B1

(12) United States Patent
Brown

(10) Patent No.: US 6,359,254 B1
(45) Date of Patent: *Mar. 19, 2002

(54) METHOD FOR PRODUCING SHAPED HOLE IN A STRUCTURE

(75) Inventor: Robert T. Brown, Bolton, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/408,695

(22) Filed: Sep. 30, 1999

(51) Int. Cl.$^7$ .............................................. B23K 26/00
(52) U.S. Cl. .............................. 219/121.71; 219/121.7; 219/121.76
(58) Field of Search .......................... 219/121.71, 121.7, 219/121.67, 121.6, 121.11, 121.61–121.74, 121.76–121.8; 350/484, 6.4, 287, 574, 421, 447

(56) References Cited

U.S. PATENT DOCUMENTS

| | | | |
|---|---|---|---|
| 4,411,730 A | * 10/1983 | Fishter et al. ................. 156/626 |
| 4,808,785 A | * 2/1989 | Vertz et al. ................. 219/69 M |
| 5,011,626 A | * 4/1991 | Ma et al. ........................ 252/582 |
| 5,041,716 A | * 8/1991 | Wakabayashi .......... 219/121.68 |
| 5,043,553 A | * 8/1991 | Corfe et al. ............... 219/121.7 |
| 5,049,722 A | * 9/1991 | Corfe et al. ............. 219/121.71 |
| 5,140,127 A | * 8/1992 | Stroud et al. ........... 219/121.71 |
| 5,345,057 A | * 9/1994 | Muller .................... 219/121.71 |
| 5,418,345 A | * 5/1995 | Adamski .................. 219/69.17 |
| 5,683,600 A | * 11/1997 | Kelley et al. .......... 219/121.71 |
| 5,719,372 A | * 2/1998 | Togari et al. ............ 219/121.61 |
| 5,739,502 A | * 4/1998 | Anderson et al. ....... 219/121.71 |
| 5,837,964 A | * 11/1998 | Emer et al. ............. 219/121.71 |
| 5,914,060 A | * 6/1999 | Flis et al. ................ 219/121.71 |

OTHER PUBLICATIONS

Brown, R. T. et al., "High–Brightness Laser Cutting & Drilling of Aerospace Materials", ICALEO 1996—Section C, pp. 78–85.
Chen, X. et al., "Laser drilling of advanced materials: effects of peak power, pulse format, and wavelength", Journal of Laser Applications, 8(5) (1996), pp. 233–239.
Chen, Xiangli et al., "Improved hode drilling using a high peak power Nd:YAG laser at the second harmonic wavelength", Journal of Laser Applications 9(6) (1997), pp. 287–290.

* cited by examiner

Primary Examiner—Blaine Copenheaver
Assistant Examiner—Zidia Pittman

(57) ABSTRACT

The present invention is a more efficient method for manufacturing shaped holes, which include a diffuser section and a cylindrical meter section. Unlike electro-discharge machining (EDM), which is the current method for manufacturing shaped holes, the method of the present invention laser drills the diffuser section followed by the cylindrical meter section. Laser drilling the cylindrical meter section creates the formation of re-solidified vapor in the diffuser section, which is easily milled. Recognizing that it is much easier to mill re-solidified vapor compared to the parent material, the present invention first creates the diffuser section and allows re-solidified vapor to form therein. Although the re-solidified vapor is thereafter milled, the entire process of the present invention is a more efficient method for producing shaped holes in comparison to EDM.

32 Claims, 4 Drawing Sheets

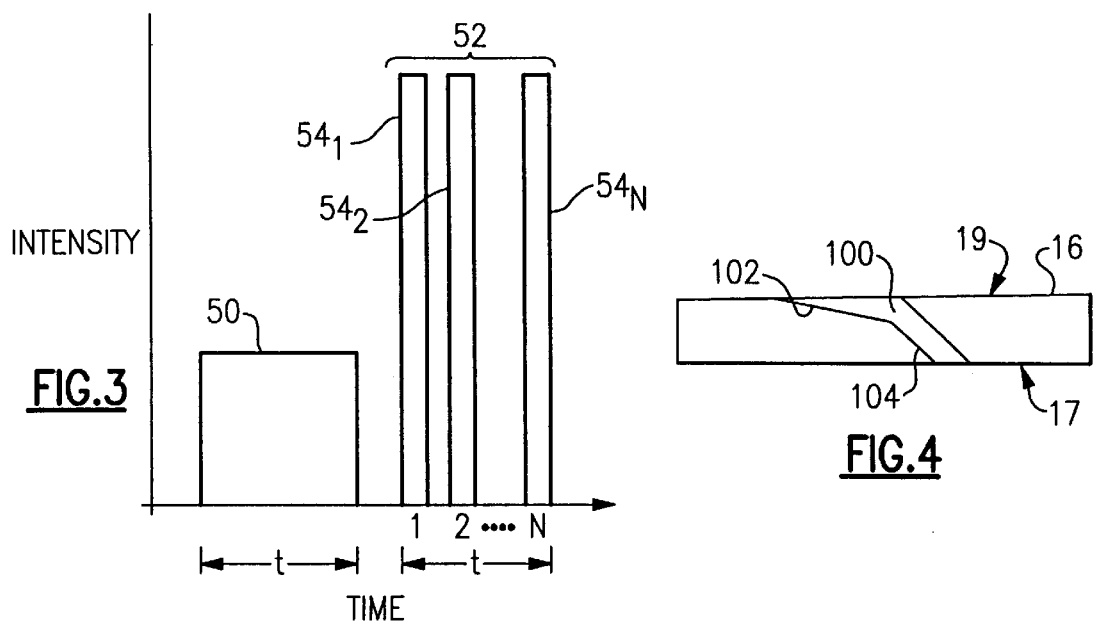
FIG.3
FIG.4
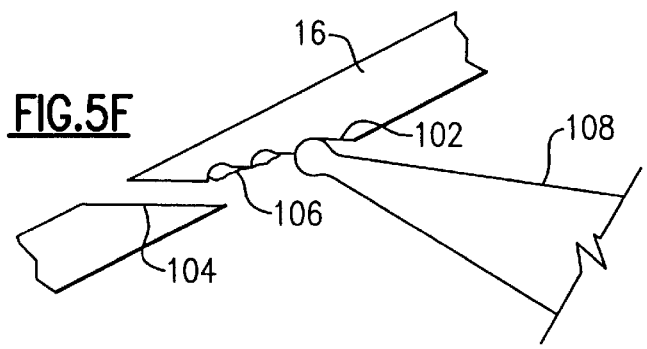
FIG.5F
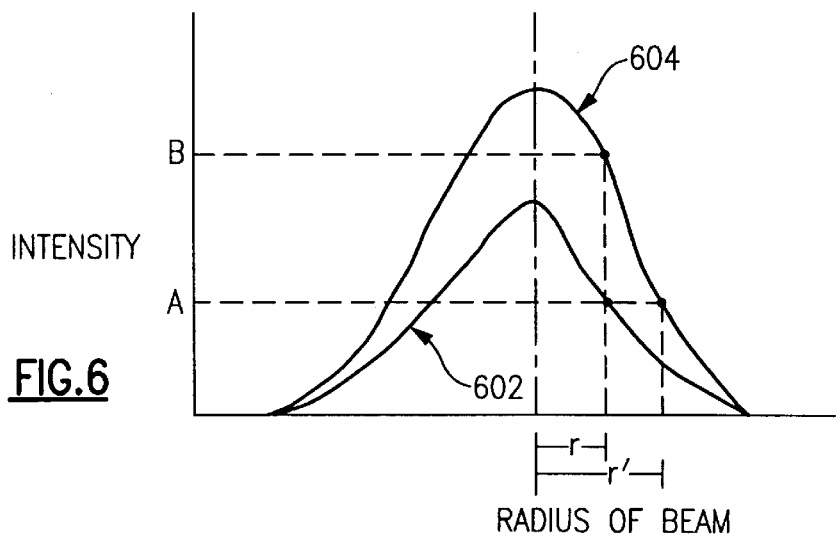
FIG.6

METHOD FOR PRODUCING SHAPED HOLE IN A STRUCTURE

DESCRIPTION

1. Technical Field

This invention relates to a method for producing a hole in a structure, and more particularly, to a method for accurately reproducing shaped holes.

2. Background Art

Airfoils, such as turbine blades and vanes, are typically exposed to high temperatures ranging from about 800° C. to 1600° C. One method of protecting airfoils from such extreme temperature conditions includes film cooling. Film cooling comprises the method of passing pressurized air through cooling holes, thereby allowing the air to pass over the exterior of the airfoil, as the airfoil rotates through the combustion gases. The geometric shape of the cooling holes includes both cylindrical holes and shaped holes. Cylindrical holes comprise holes generally having a circular cross section through the entire exterior wall of the airfoil, thereby allowing the pressurized air to pass through the airfoil. Manufacturing processes used to manufacture cylindrical holes are discussed in U.S. patent application Ser. No. 09/356,528, which is owned by the assignee of the present invention and hereby incorporated by reference.

Shaped holes, alternatively, include both a cylindrical meter section and a diffuser section. The cylindrical meter section allows the pressurized air to pass through the airfoil, and the diffuser section assists in directing the pressurized air over the airfoil's exterior surface. In order to direct the pressurized air as close as possible to the exterior surface, the shape of the diffuser section is typically tapered from the cylindrical metered section to the airfoil's exterior surface. The present method for manufacturing shaped holes is electro-discharge machining (EDM), wherein an appropriately shaped electrode contacts a structure that is typically immersed in a dielectric fluid. Near contact between the electrode and the structure, combined with a pulsed voltage, creates a spark between the electrode and the structure, thereby causing the structure to erode in the shape of the electrode.

EDM produces holes that accurately mimic the shape of the electrode. This machining process, however, often causes the tip of the electrode to deteriorate. If the tip of the electrode wears such that it fails to maintain its original configuration, the electrode may produce an undesirably shaped hole. Additionally, extended use of a single electrode often creates a sharp tip at the end of the electrode. The sharp tipped electrode, therefore, often contacts undesirable structural layers, thereby creating unwanted holes within the structure. For example, an airfoil is a two layer structure with a cavity therebetween. If the electrode loses its shape and obtains a sharp tip, the tip of the electrode may penetrate too deeply into the cavity and create a hole on the opposite side of the airfoil, thereby resulting in an additional and undesirable hole. One means of minimizing this potential risk includes frequent replacement of the electrodes. EDM, however, is an inherently time-consuming machining process, and frequent electrode replacement further increases such machining time. Furthermore, extended machining time and regular replacement of electrodes tends to increase the overall manufacturing cost.

What is needed is an efficient method for accurately manufacturing shaped holes in structures, such as airfoils.

DISCLOSURE OF INVENTION

The present invention utilizes pulsed laser beams to create both the diffuser section and the cylindrical meter section of a shaped hole, after which the diffuser section is milled. The pulsed laser beams include both unmodulated pulsed laser beams and modulated pulsed laser beams. An unmodulated pulsed laser beam (hereinafter referred to as "unmodulated beam") typically has a pulse width of about 0.1 milliseconds (msec) to about 10 msec and a peak intensity on the order of about $1 \times 10^6$ W/cm$^2$ to about $10 \times 10^6$ W/cm$^2$. A modulated pulsed laser beam (hereinafter referred to as "modulated beam"), typically has a pulse width of about 1 nanosecond (nsec) to about 500 nsec and a peak intensity greater than $1 \times 10^8$ W/cm$^2$. For the purposes of this invention, an unmodulated beam and a modulated beam shall be defined in respect to each other. Specifically, a modulated beam shall be defined as having a shorter pulse width and higher peak intensity in comparison to an unmodulated beam, regardless of the pulse width and peak intensity of the unmodulated beam.

When a modulated beam contacts a structure, a majority of the material typically vaporizes, thereby creating a hole. A portion of this vapor, however, usually re-forms and adheres within and/or around the hole as re-solidified vapor. Alternatively, when an unmodulated beam is used to create a hole, the material typically melts and/or boils rather than vaporizes because an unmodulated beam has lower peak intensity in comparison to a modulated beam. The molten material often re-solidifies and adheres to the internal surface of the hole. More specifically, when manufacturing the cylindrical metered section of a shaped hole, the re-solidified material typically forms within the diffuser section.

Although the re-solidified material may have similar characteristics as the parent material, the inventor of the present invention has recognized that it is less difficult to machine the re-solidified material in comparison to the parent material. The present invention, therefore exploits this distinction by first creating an undersized diffuser section using pulsed laser beams. Pulsed laser beams thereafter create the cylindrical meter section. Any re-solidified material that forms within the diffuser section is later milled away using a mechanical milling tool, thereby creating the desired shape of the diffuser section.

Accordingly, the present invention relates to a method for producing a shaped hole in a structure by initially creating a cavity in the structure. The cavity serves as an undersized diffuser section and is formed by directing a first pulsed laser beam, at a first angle, toward the structure. The first pulsed laser beam can be a modulated beam or an unmodulated beam, but is preferably a modulated beam because it typically creates a more accurate cavity. A second pulsed laser beam is thereafter directed toward the structure at a second angle in order to form the cylindrical meter section of the shaped hole. The second angle may or may not be equal to the first angle. The second pulsed laser beam can be a modulated beam, an unmodulated beam or a combination thereof It is preferable, however, to utilize an unmodulated beam followed by a modulated beam. The unmodulated beam first removes a portion of the structural material, thereby forming a guide hole for the modulated beam to follow when completing the cylindrical meter section. Utilizing both an unmodulated beam and a modulated beam in this order exploits the advantages of each type of beam. Specifically, forming a guide hole utilizing the unmodulated beam quickly removes a significant portion of the structural material because the unmodulated beam removes the material in the form of droplets, which is faster than removing the material in the form of vapor. The modulated beam thereafter cleans the hole by removing additional structural material by vaporization. Removing a significant portion of the material with the unmodulated beam, before using the modulated beam, reduces the amount of material to be later removed by the modulated beam, thereby reducing the amount of material that will be removed by vaporization. Decreasing the amount of structural material to be removed by vaporization minimizes the potential that such vapor could potentially re-solidify within or around the hole, thereby increasing the accuracy of the cylindrical meter section of the shaped hole. Any re-solidified material formed in the diffuser section during the laser drilling process is removed by milling such re-solidified vapor.

Manufacturing shaped holes utilizing pulsed laser beams and a milling tool is less time consuming than an EDM process, which translates into higher productivity and reduced operating costs. Additionally, utilizing pulsed laser beams in lieu of electrodes minimizes the material cost associated with manufacturing shaped holes because the lasers do not require replacement, unlike the electrodes. The process of the present invention also produces more accurately shaped holes compared to those produced by the EDM process. The savings associated with manufacturing time and material costs, in conjunction with the improved quality of the shaped holes, therefore, make the method of the present invention an attractive alternative manufacturing technique for the production of shaped holes.

The foregoing features and advantages of the present invention will become more apparent in light of the following detailed description of exemplary embodiments thereof as illustrated in the accompanying drawings.

BRIEF DESCRIPTION OF DRAWINGS

FIG. 3 is an enlarged view of the modulated and unmodulated pulsed signals shown in FIG. 2.

FIG. 4 is a side sectional view of a structure with a shaped hole therein.

FIGS. 5A to 5F depict discrete steps for manufacturing the shaped hole illustrated in FIG. 4, wherein:

FIG. 5A depicts a pulsed beam creating a cavity in a structure.

FIG. 5B depicts another pulsed beam enlarging the cavity.

FIG. 5C. depicts an additional pulsed beam further enlarging the cavity.

FIG. 5D depicts a different pulsed beam creating a hole through the cavity and the structure.

FIG. 5E depicts a final pulsed beam enlarging the circular cross section of the hole.

FIG. 5F depicts a milling tool removing the re-solidified vapor from the cavity, which is the diffuser section of the shaped hole.

FIG. 6 is a graph of the intensity of the beam as a function of the beam's radius.

FIGS. 7A to 7C. depict an alternate method for manufacturing the shaped hole illustrated in FIG. 4, wherein:

FIG. 7A depicts a pulsed beam contacting a structure at angle $\theta_1$ and creating a cavity therein.

FIG. 7B depicts an other pulsed beam contacting the structure at angle $\theta_2$ and creating a hole through the cavity and structure.

FIG. 7C. depicts a milling tool removing the re-solidified vapor from the cavity, which is the diffuser section of the shaped hole.

BEST MODE FOR CARRYING OUT THE INVENTION

Figure 1:
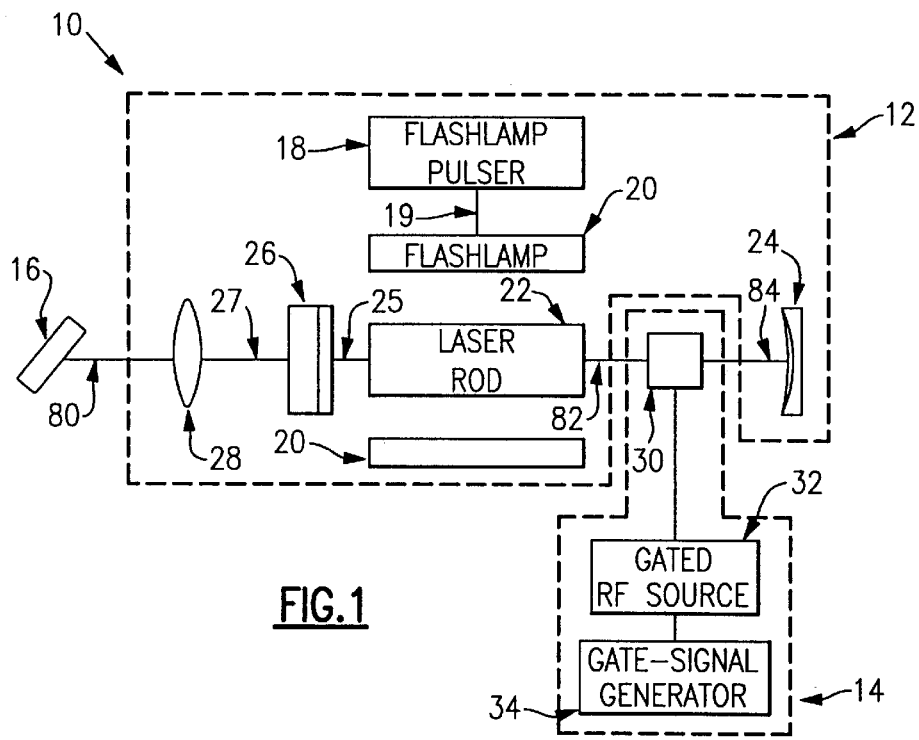
FIG. 1 depicts a Q-switched laser emitting a focussed beam that contacts a structure.

Referring to FIG. 1, there is shown a Q-switched laser 10 emitting a focussed beam 80 at a structure 16. The Q-switched laser 10 comprises a laser system 12 and a Q-switch 14. Because the type of laser used to produce a hole is often dependent upon the material of the structure 16, and the material of structure 16 is highly concentrated nickel alloy, the laser system 12 shown in FIG. 1 is a neodymium yttrium aluminum garnet (Nd:YAG) laser manufactured by Convergent Energy under the tradename Aurora having a Model No. P-50. Such a laser system 12 is capable of producing a focussed beam 80 having a wavelength equal to about 1.06 microns, with an unmodulated peak power of about 50 kW and an average power of about 250 W. The preferred operating range of the laser system 12 typically has an unmodulated peak power in the range of about 5 to 20 kW and an average power of about 100 W.

The Nd:YAG laser system 12 comprises a flashlamp pulser 18, flashlamps 20, a laser rod 22, a mirror 24, an output mirror 26 and a focus lens 28. The flashlamp pulser 18 delivers a signal, in the form of a high current pulse, at a rate of about 10 Hz to 200 Hz along line 19 to the flashlamp 20. The flashlamp 20 receives the high current pulse, which has a pulse width of about 0.1 msec to 10.0 msec, and emits light within the ultraviolet to visible range at the same rate and duration as the high current pulse. The laser rod 22, which is a Nd:YAG crystal, absorbs the light and emits a pulsed beam along line 82. The pulsed beam 82 passes through an acousto-optic modulator 30, discussed hereinafter, along line 84 and contacts the mirror 24. The mirror 24 reflects the pulsed beam along line 84 and again passes through the acousto-optic modulator 30. When the acousto-optic modulator 30 is in the "off" state, the pulsed beam is said to be an unmodulated beam because the pulsed beam retains its original pulse width and intensity as it passes through the acousto-optic modulator 30. Upon exiting the acousto-optic modulator 30, the beam passes through the laser rod 22, thereby amplifying the beam as it exits the laser rod 22 along line 25. A portion of the beam passes through the output mirror 26 along line 27, and the output mirror 26 reflects the remaining portion of the unmodulated beam along line 25 in order to sustain laser oscillation between the output mirror 26 and the mirror 24. The portion of the beam that passes through the output mirror 26 also passes through the focus lens 28, which concentrates and focuses the beam 80 in order to achieve the desired intensity for drilling a cavity or hole in the structure 16.

Figure 2:
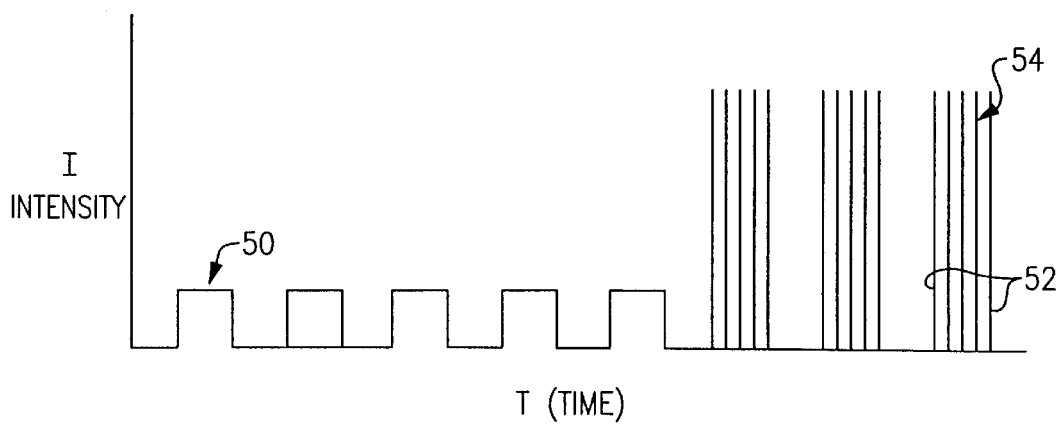
FIG. 2 illustrates the pulse pattern of an unmodulated and modulated pulsed signal emitted by the Q-switched laser illustrated in FIG. 1.

The Q-switch 14 comprises the acousto-optic modulator 30, a gate-signal generator 34 and a gated rf source 32. The Q-switch 14 causes the laser system 12 to emit either an unmodulated beam or a modulated beam. The Q-switch 14 has an "on" state and an "off" state, and when the Q-switch 14 is in the "off" state, the laser system 12 emits an unmodulated beam, and when the Q-switch 14 is in the "on" state, the laser system 12 emits a modulated beam. Regardless of whether the focussed beam 80 is a modulated or unmodulated beam, the focussed beam 80 actually consists of a series of pulses. Referring to FIG. 2, there is shown a chart of intensity versus time, which illustrates a series of unmodulated pulses and a series of modulated pulses emitted by the Q-switched laser 10 illustrated in FIG. 1. The signal represented by numeral 50 is an unmodulated pulse and typically has a pulse width of about 0.2 to 1.0 milliseconds (msec) and an intensity of about $2\times10^6$ to $8\times10^6$ W/cm$^2$. The pulse represented by numeral 54 is a modulated pulse (i.e., micro pulse) and typically has a pulse width of about 50 to 200 nanoseconds (nsec) and an intensity of about $2\times10^8$ to $1\times10^9$ W/cm$^2$.

Referring to FIG. 3 there is shown a further explanation of the relationship between an unmodulated pulse 50 and a modulated pulse 54. The unmodulated pulse 50 is a continuous pulse over a time period t, but a modulated pulse is an individual discrete micro pulse within a macro pulse 52. Each micro pulse is represented by numeral 54 with an individual subscript numeral up to the total number (n) of micro pulses (i.e., $54_1$, $54_2$, ... $54_n$). The total number (n) of micro pulses is dependent upon the number of times the acousto-optic modulator 30 alternates between the "off" and "on" states during the time interval t, which is a further function of the duration that the acousto-optic modulator 30 remains in each state. Although the intensity of each micro pulse 54 is greater than the individual intensity of the unmodulated pulse 50, the total energy of each macro pulse 52 is equal to the integral of the energy emitted by the aggregate of the micro pulses $54_1$, $54_2$, ... $54_n$. In accordance with the invention, the total energy emitted by the macro pulse 52 is approximately equal to the total energy emitted by an unmodulated pulse 50 over the same time period t.

Referring back to FIG. 1, the Q-switch 14 of the present invention controls the number of times the acousto-optic modulator 30 alternates between the "off" and "on" states during the time interval t and the duration the acousto-optic modulator 30 remains in each state, thereby controlling the intensity of each micro pulse 54. The gate signal generator 34 sends a square pulse signal to the gated radio frequency (rf) source 32 having a preferred gate frequency in the range of about 40 to 300 kHz and a preferred pulse width of about 23 to 1 microseconds. One example includes a gate signal generator 34 that has the capability of producing a square pulse signal having a frequency of 300 kHz and a pulse width of about 1 microsecond. A Hewlett Packard Model No. 8116A is an acceptable gate signal generator. The gated radio frequency (rf) source 32, in turn, sends a radio frequency signal, having a frequency of about 1 to 1000 MHz, to the acousto-optic modulator 30. Examples of a gated radio frequency (rf) source 32 and acousto-optic modulator 30 include those manufactured by Intra Action, with a Model No. GE-27100T and Model No. AQS-275A1A respectively, which allows the gated radio frequency (rf) source 32 to emit a radio frequency signal, having a frequency of about 27.12 MHz, to the acousto-optic modulator 30. The acousto-optic modulator 30 alternates between the "on" and "off" states at a rate equal to the gate-frequency of the radio frequency signal, which is greater than the frequency signal produced by the flashlamp pulser 18, the device that initiates the formation of the modulated pulse. When the Q-switch 14 is in the "on" state, the Q-switch 14 creates modulated pulses $54_1$, $54_2$, ... $54_n$ from an unmodulated pulse 50. In one example, the gate signal generator 34 produced a 300 kHz signal that the gated radio frequency (rf) source received. The gated radio frequency (rf) source, in turn, produced a gated 27.12 MHz radio frequency signal that created a series of modulated pulses $54_1$, $54_2$, ... $54_n$. Each modulated pulse $54_1$, $54_2$, ... $54_n$ had a pulse width of about 100 nsec and an intensity of about $2\times10^8$ W/cm$^2$. The modulated pulses derived from an unmodulated pulse 50 having a pulse width of about 0.5 msec and an intensity of about $6\times10^6$ W/cm$^2$. Thus, about 150 modulated pulses occurred in the time about one unmodulated pulse occurred.

Referring to FIG. 4, there is shown a shaped hole 100 within a structure 16, wherein the shaped hole 100 comprises a diffuser section 102 and a cylindrical meter section 104. In the situation wherein the structure 16 is an airfoil, pressurized air passes from the bottom side 17 to the top side 15 of the structure 16 through the shaped hole 100. Specifically, the cylindrical meter section 104 allows the pressurized air to pass from the bottom side 17 to the top side 15, and the diffuser section 102 assists the pressurized air in flowing over the desired area on the top side 15.

Figure 5A:
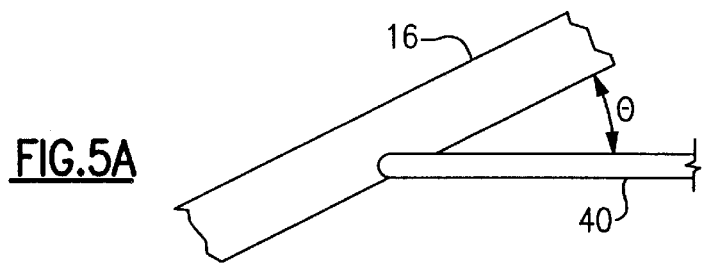

FIGS. 5A–5F illustrate a method of manufacturing a shaped hole illustrated in FIG. 4. Referring to FIG. 5A, there is shown a pulsed laser beam 40 emitted from the Q-switched laser 10 and focused at a structure 16 at an angle θ. The pulsed laser beam 40 creates a cavity, which serves as the diffuser section 102 of the shaped hole 100. Although it is possible to use either an unmodulated beam or a modulated beam to laser drill the cavity, it is preferable to use a modulated beam because a modulated beam produces a more accurate hole in a shorter time. For example, wherein the structure 16 comprises a highly concentrated nickel alloy having a thickness of about 0.10 cm (0.040 inches), it is preferable to use a modulated beam comprising one macro pulse, which in turn comprises 75 micropulses, wherein each micro pulse has a pulse width of about 100 nsec and an intensity of about $2\times10^8$ W/cm$^2$.

Figure 5B:
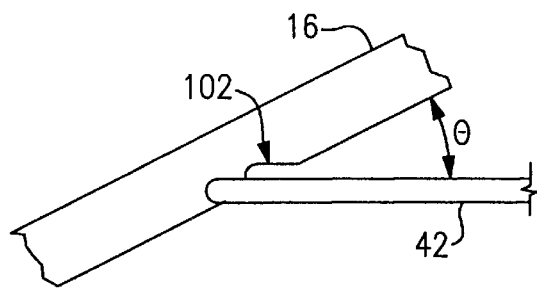

Referring to FIG. 5B, there is shown a pulsed laser beam 42 emitted from the Q-switched laser 10 and focused at the structure 16 at the same angle θ. In comparison to the pulsed laser beam 40 illustrated in FIG. 5A, the pulsed laser beam 42 in FIG. 5B contacts the structure 16 at a different focal point because the structure 16 and pulsed laser beam have moved in relation to one another. Continuing to refer to FIG. 5B, the pulsed laser beam 42 and structure 16 are oriented such that the pulsed laser beam 42 passes through a portion of the cavity, thereby enlarging the diffuser section 102. Although it is possible to use either an unmodulated beam or a modulated beam to enlarge the diffuser section 102, it is preferable to use the same type of beam that is used to laser drill the cavity. Because a modulated beam was used to produce the cavity, it is preferable to use a modulated beam comprising two macro pulses to enlarge the cavity, wherein each macro pulse comprises 75 micropulses, and wherein each micro pulse has a pulse width of about 100 nsec and an intensity of about $2\times10^8$ W/cm$^2$.

Figure 5C:
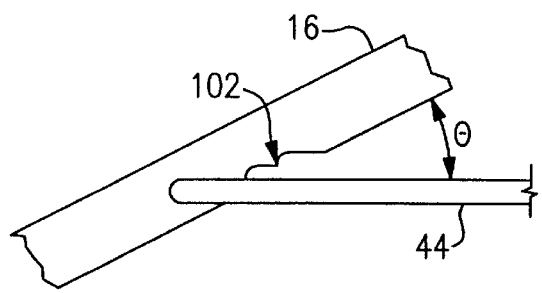

Referring to FIG. 5C, there is shown a pulsed laser beam 44 emitted from the Q-switched laser 10 and focused at the structure 16 at the same angle θ. This pulsed laser beam 44 further enlarges the diffuser section 102 by focussing the pulsed laser beam 44 at a different focal point than the focal points shown in FIGS. 5A and 5B. As illustrated in FIG. 5C, the structure 16 and the Q-switched laser 10 are oriented such that the pulsed laser beam 44 passes through a portion of the cavity. Continuing to refer to FIG. 5C, it is again possible to use either an unmodulated beam or a modulated beam to further enlarge the diffuser section 102. Because a modulated beam was used to produce and enlarge the cavity, it is preferable to again use a modulated beam to further enlarge the diffuser section 102. Specifically, it is preferable to use a modulated beam comprising three macro pulses, wherein each macro pulse comprises 75 micro pulses, and wherein each micro pulse has a pulse width of about 100 msec and an intensity of about $2 \times 10^8$ W/cm$^2$. Although not illustrated, this enlarging step can be repeated until the desired shape of the diffuser section 102 is achieved.

Figure 5D:
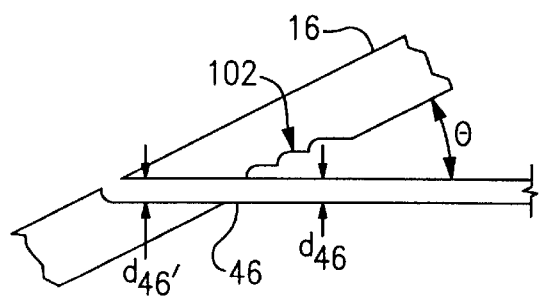

Referring to FIG. 5D, there is shown a pulsed laser beam 46 emitted from the Q-switched laser 10 and focused at the structure 16 at the same angle θ. Again, this pulsed laser beam 46 is focused at a different focal point than the focal points illustrated in FIGS. 5A–5C. Continuing to refer to FIG. 5D, the pulsed laser beam 46 penetrates through the structure, thereby creating the cylindrical meter section 104 of the shaped hole 100. Although it is possible to independently use either an unmodulated beam or a modulated beam to laser drill the cylindrical meter section 104, it is preferable to use a combination of modulated and unmodulated beams. Specifically, it is preferable to initially drill the hole using an unmodulated beam followed by a modulated beam because the unmodulated beam creates a guide hole for the modulated beam to enter and refine the parameters of the hole by removing any undesired material. FIG. 5D, therefore, depicts an unmodulated beam 46 passing through a portion of the diffuser section 102 and penetrating the structure 16. Penetrating the 0.10 cm (0.040 inches) thick highly concentrated nickel alloy structure 16 required about seven (7) unmodulated pulses, wherein each unmodulated pulse had a pulse width of about 0.5 msec and an intensity of about $3 \times 10^6$ W/cm$^2$. After initially penetrating the structure 16, it is preferable to continue pulsing the unmodulated beam 46 in order to produce a cleaner cylindrical metered section 104. Specifically, it is preferable to continue pulsing the unmodulated beam 46 through the structure 16 with additional unmodulated pulses that represent about ten percent (10%) to thirty percent (30%) of the unmodulated pulses required to penetrate through the structure 16. It is especially preferable to use additional unmodulated pulses that represent about twenty percent (20%) of the unmodulated pulses required to penetrate through the structure 16. Because penetrating the structure 16 required about seven (7) unmodulated pulses, it was preferable to continue pulsing the unmodulated beam 46 for about one (1) to three (3) additional pulses, and especially preferable to continue pulsing the unmodulated beam 46 for an additional two (2) pulses after the unmodulated b6am 46 first penetrated the structure 16.

Figure 5E:
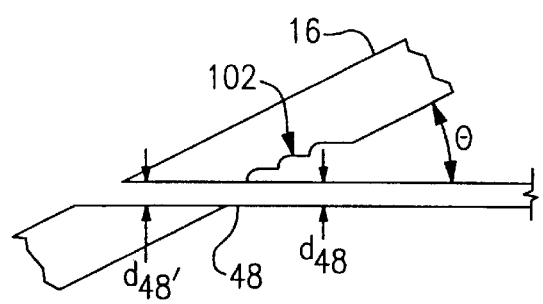

Referring to FIG. 5E, there is shown a modulated beam 48 emitted from the Q-switched laser 10 and focused at the structure 16 at the same angle θ. In order to efficiently produce a clean cylindrical meter section, it is also preferable to pulse the modulated beam 48 with a number of macro pulses that represent about forty percent (40%) to eighty percent (80%) of the unmodulated pulses required to penetrate through the structure 16. It is even more preferable that the modulated beam 48 contain a number of macro pulses that represent about fifty percent (50%) to seventy percent (70%) of the unmodulated pulses required to penetrate through the structure 16 and especially preferable that the modulated beam 48 contain a number of macro pulses that represent about sixty percent (60%) of the unmodulated pulses required to penetrate through the structure 16. As mentioned above, penetrating the structure 16 with an unmodulated beam 46 required about seven (7) unmodulated pulses. It would, therefore, be preferable to pulse a modulated beam 48 having a pulse width of about 100 nsec and an intensity of about $2.0 \times 10^8$ W/cm$^2$ for about two (2) to six (6) macro pulses, even more preferable to use three (3) to five (5) macro pulses and especially preferable to use four (4) macro pulses.

Referring to FIG. 5F, the process of laser drilling the cylindrical meter section 104 typically creates the formation of re-solidified vapor 106 within the diffuser section 102 of the shaped hole 100. The inventor of the present invention discovered that it is less difficult to machine the re-solidified material in comparison to machining the parent material. The present invention, therefore, exploits this distinction by first creating an undersized diffuser section followed by the cylindrical meter section using pulsed laser beams. Any re-solidified material that forms within the diffuser section is thereafter milled away using a mechanical milling tool 108 to form the desired shape of the diffuser section 102. The mechanical milling tool 108 illustrated in FIG. 5F is a ball milling device, but could be any other type of known milling tool.

Referring back to FIG. 5D, the unmodulated beam 46 has an actual diameter ($d_{46}$) and an effective diameter ($d_{46'}$). The effective diameter is different than the actual diameter. The beam's actual diameter (i.e., theoretical diameter) is the diameter calculated from standard optical formulas. A common definition of the actual diameter is the diameter of a circular aperture which passes about $(1-e^{-2}) \times 100\%$ (i.e., 86.5%) of the total power of the beam The beam's effective diameter is the diameter of the hole produced by the beam. Therefore, the beam's actual diameter is independent of the beam's absolute power because the beam's actual diameter is a relative measure. The beam's effective diameter, however, is dependent upon the beam's absolute power because the beam will only form a hole representative of that portion of the cross section of the beam that has a power level greater than or equal to a power level that causes the material to melt or vaporize. In this instance, the unmodulated beam 46 had an actual diameter ($d_{46}$) of about 0.038 cm (0.015 inches) and an effective diameter ($d_{46'}$) of about 0.033 cm (0.013 inches). The 0.038 cm diameter unmodulated beam, therefore, produced a 0.033 cm diameter cylindrical meter section 104.

Referring to FIG. 5E, the modulated beam 48, has about the same actual diameter ($d_{48}$) as the unmodulated beam 46, in FIG. 5D. The modulated beam 48 in FIG. 5E, however, has a greater effective diameter ($d_{48'}$) than the unmodulated beam 46 in FIG. 5D. Specifically, the modulated beam 48 in FIG. 5E had an actual diameter ($d_{48}$) equal to about 0.038 cm (0.015 inches) and an effective diameter ($d_{48'}$) equal to about 0.035 cm (0.014 inches) compared to the unmodulated beam 46, which had an actual diameter ($d_{46}$) of about 0.038 cm (0.015 inches) and an effective diameter ($d_{46'}$) of about 0.033 cm (0.013inches). The modulated beam 48 in FIG. 5E, therefore, enlarges the original cylindrical meter section 104 drilled by unmodulated beam 46 in FIG. 5D.

The modulated beam 48 has a greater effective diameter ($d_{48'}$) than the unmodulated beam 46 because the modulated beam 48 has a higher intensity than the unmodulated beam 46. Referring to FIG. 6 there is shown a graph of the intensity of the beam versus the radius of the beam. The curve indicated by the numeral 602 represents the profile of the intensity of the unmodulated beam 46 in FIG. 5D, and the curve indicated by the numeral 604 represents the profile of the intensity of a modulated beam 48 in FIG. 5E. At a radius "r", the intensity level of the unmodulated beam 46 is equal to A, and the intensity level of the modulated beam 48 is equal to B, wherein B is greater than A. Assuming that the unmodulated beam 46 and modulated beam 48 have the same radius (i.e., actual diameter), the modulated beam 48 has a higher power level at radius r than the unmodulated beam 46. The inventor of the present invention recognized that as the beam switched from an unmodulated beam 46 to a modulated beam 48, the modulated beam 48 achieved a power level A at a greater radius than the unmodulated beam 46. Specifically, the unmodulated beam 46 achieved a power level of A at radius r, but the modulated beam 48 achieved a power level of A at radius r', which is greater than r. Therefore, although both the unmodulated beam 46 and modulated beam 48 have the same actual diameter, the effective diameter of the modulated beam 48 is greater than the effective diameter of the unmodulated beam 46 because the modulated beam 48 has a higher intensity at a given radius. The present invention exploits this phenomenon of having two beams with the same actual diameter but different effective diameters by using an unmodulated beam 46 to drill the initial cylindrical meter section 104 and then switches to a modulated beam 48 to increase the diameter of the cylindrical meter section 104. The increased intensity of the modulated beam 48 removes the majority of remaining material by vaporization, in comparison to the unmodulated beam 46, which removes a majority of the material by melting and/or boiling the material, thereby reducing the hole-to-hole variation and producing a hole with a geometry that more closely resembles the circular cross section of the focused beam 80. The Q-switch 14, therefore, is the means for producing a modulated beam 48 with an effective diameter greater than that of the unmodulated beam 46.

An alternate embodiment of the present invention includes the steps of initially milling the diffuser section 102 followed by the remaining steps, outlined above. The remaining steps comprise utilizing the unmodulated and/or modulated laser beams to drill the cylindrical meter section 104 and milling the re-solidified vapor 106 that forms in the diffuser section 102. The inventor's recognition that the re-solidified vapor forms in the diffuser section 102 and that the machining of re-solidified vapor is easier than machining the parent material, led to the inventor's discovery that machining the diffuser section 102 followed by laser drilling the cylindrical meter section 104 provides a time saving as well as material advantage.

Figure 7A:
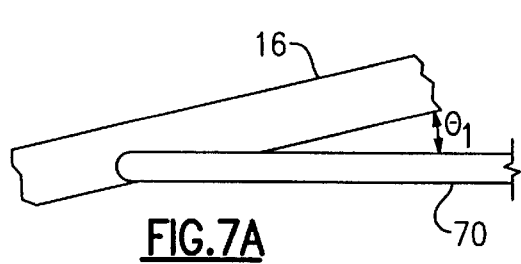
Figure 7B:
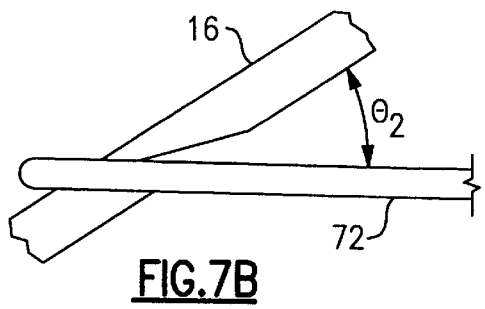
Figure 7C:
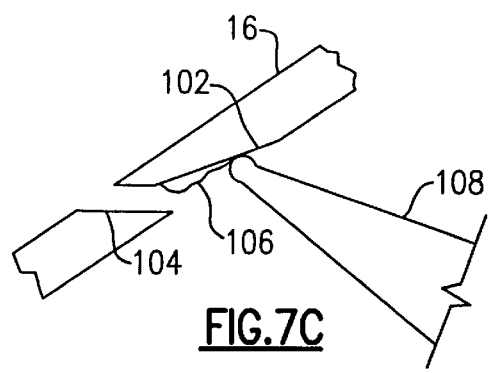

FIGS. 7A–7C illustrate a method of manufacturing a shaped hole illustrated in FIG. 4. Referring to FIG. 7A, there is shown a pulsed laser beam 70 emitted from the Q-switched laser 10 and focused at a structure 16 at an angle $\theta_1$. The pulsed laser beam 70 creates a cavity, which serves as the diffuser section 102 of the shaped hole 100. Assuming that the pulsed laser beam 70 has an adequate effective diameter that is focussed to reach the desired depth within the structure 16 and assuming that there is line-of-sight access to the structure 16 along the angle $\theta_1$, one pulsed laser beam may be adequate to form the desired cavity. If necessary, however, additional pulsed laser beams may be directed at the structure 16 to increase the size of the cavity. Although it is possible to use either an unmodulated beam or a modulated beam to laser drill the cavity, it is preferable to use a modulated beam because a modulated beam produces a more accurate hole in a shorter time period.

Referring to FIG. 7B, there is shown a pulsed laser beam 72 emitted from the Q-switched laser 10 and focused at the structure 16 at an angle $\theta_2$, which is different than angle $\theta_1$. In comparison to the pulsed laser beam 70 illustrated in FIG. 7A, the pulsed laser beam 72 in FIG. 7B contacts the structure 16 at a different focal point because the structure 16 and pulsed laser beams have moved in relation to one another, thereby increasing the angle between the structure 16 and pulsed laser beam 72. Continuing to refer to FIG. 7B, the pulsed laser beam 72 and structure 16 are oriented such that the pulsed laser beam 72 passes through a portion of the cavity and penetrates through the structure, thereby creating the cylindrical meter section 104 of the shaped hole 100. Although it is possible to independently use either an unmodulated beam or a modulated beam to laser drill the cylindrical meter section 104, it is preferable to use a combination of modulated and unmodulated beams. Specifically, it is preferable to initially drill the hole using an unmodulated beam followed be a modulated beam because the unmodulated beam creates a guide hole for the modulated beam to enter and refine the parameters of the hole by removing any undesired material as discussed hereinbefore in relation to FIGS. 5A to 5F.

Referring to FIG. 7C, any re-solidified material 106 that forms within the diffuser section 102 is removed by using a mechanical milling tool 108 to mill the re-solidified material 106 and/or diffuser section 102 to form the desired shape of the diffuser section 102.

Figure 8:
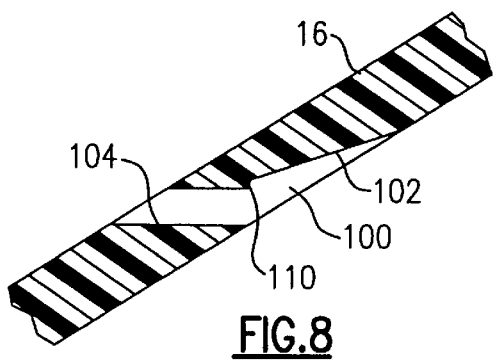
FIG. 8 depicts a side sectional view of a structure with a shaped hole therein and a sharp edge at the intersection of the diffuser and meter sections.
Figure 9:
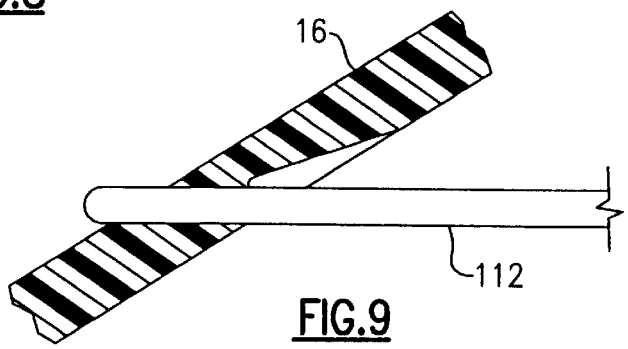
FIG. 9 depicts a final pulsed beam removing the sharp edge of the shaped hole illustrated in FIG. 8.

Referring to FIG. 8, milling the diffuser section 102 may create a sharp edge 110 at the intersection of the cylindrical meter section 104 and the diffuser section 102. The sharp edge 110 may prevent the air from passing through the shaped hole 100 and over the structure 16 as originally desired. Referring to FIG. 9, one method of removing the sharp edge 110 includes emitting a pulsed laser beam 112 from the Q-switched laser 10 and focussing the pulsed laser beam 112 through the shaped hole 100 such that the pulsed laser bean 112 contacts the sharp edge 110. Although it is possible to use either an unmodulated or modulated beam, it is preferable to use a modulated beam because it produces a cleaner hole.

Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. A method for producing a shaped hole in a structure, comprising, in series, the steps of:
    (a) emitting a first pulsed laser beam from a laser system and focusing said first pulsed laser beam at a first focal point on a structure until a cavity is formed within said structure;
    (b) emitting a second pulsed laser beam from said lasers system and focusing said second pulsed laser beam at a second focal point such that said second pulsed laser beam passes through at least a portion of said cavity within said structure, said second pulsed laser beam penetrating through said structure, thereby forming a shaped hole within said structure; and
    (c) milling the cavity portion of the shaped hole.

2. The method of claim 1 further comprising the step of enlarging said cavity by emitting an other pulsed laser beam from said laser system and focusing said other pulsed laser beam at an other focal point on said structure.

3. The method of claim 1 wherein said first pulsed laser beam is a modulated pulsed laser beam.

4. The method of claim 1 wherein said first pulsed laser beam is an unmodulated pulsed laser beam.

5. The method of claim 1 wherein said second pulsed laser beam is a modulated pulsed laser beam.

6. The method of claim 1 wherein said second pulsed laser beam is an unmodulated pulsed laser beam.

7. The method of claim 1 further comprising the step of emitting a third pulsed laser beam from said laser system and focusing said third pulsed laser beam at said second focal point such that said third pulsed laser beam penetrates through said structure.

8. The method of claim 7 wherein said third pulsed laser beam is a modulated pulsed laser beam.

9. The method of claim 7 wherein said third pulsed laser beam is an unmodulated pulsed laser beam.

10. The method of claim 1 wherein said structure is an airfoil.

11. The method of claim 1 wherein the step of milling the cavity portion of the shaped hole comprises utilizing a mechanical milling tool.

12. The method of claim 11 wherein said mechanical milling tool is a ball milling device.

13. A method for producing a shaped hole in a structure, comprising the steps of:
   (a) emitting a first predetermined number of pulses from a laser system to a first focal point on said structure thereby creating a cavity in said structure;
   (b) emitting a second pre determined number of unmodulated pulses from said laser system to a second focal point on said structure such that said unmodulated pulses pass through at least a portion of said cavity and create a hole through said structure, each of said unmodulated pulses having an effective diameter, an intensity and a pulse width;
   (c) emitting at least one macro pulse from said laser system into the hole, said macro pulse comprising a series of modulated pulses, said modulated pulse having an effective diameter at least as great as the effective diameter of said unmodulated pulse, said modulated pulse having an intensity greater than the intensity of said unmodulated pulse, said modulated pulse having a pulse width less than the pulse width of said unmodulated pulse; and
   (d) milling the cavity portion of the hole.

14. The method of claim 13 further comprising the step, between steps (b) and (c), of emitting a third predetermined number of unmodulated pulses from said laser system into the hole.

15. The method of claim 14 wherein said third predetermined number of unmodulated pulses is equal to about 10% to 30% of the second predetermined number of unmodulated pulses.

16. The method of claim 14 wherein said third predetermined number of unmodulated pulses is equal to about 20% of the second predetermined number of unmodulated pulses.

17. The method of claim 13 wherein the number of macro pulses in step (c) is equal to about 40% to 80% of the second predetermined number of unmodulated pulses.

18. The method of claim 13 wherein the number of macro pulses in step (c) is equal to about 50% to 70% of the second predetermined number of unmodulated pulses.

19. The method of claim 13 wherein the number of macro pulses in step (c) is equal to about 60% of the second predetermined number of unmodulated pulses.

20. The method of claim 13 wherein said pulses in step (a) are modulated pulses.

21. The method of claim 13 wherein said pulses in step (a) are unmodulated pulses.

22. The method of claim 13 wherein said structure is an airfoil.

23. The method of claim 13 wherein the step of milling the cavity portion of the shaped hole comprises utilizing a mechanical milling tool.

24. The method of claim 23 wherein said mechanical milling tool is a ball milling device.

25. A method for producing a shaped hole in an airfoil, comprising the steps of:
   (a) emitting a first predetermined number of modulated pulses from a laser system to a first focal point on an airfoil thereby creating a cavity in said airfoil;
   (b) emitting a second predetermined number of unmodulated pulses from said laser system to a second focal point on said airfoil such that said unmodulated pulses pass through at least a portion of said cavity and create a hole through said airfoil, each of said unmodulated pulses having an effective diameter, an intensity and a pulse width;
   (c) emitting a third predetermined number of unmodulated pulses from said laser system into the hole;
   (d) emitting at least one macro pulse from said laser system into the hole, said macro pulse comprising a series of modulated pulses, said modulated pulse having an effective diameter at least as great as the effective diameter of said unmodulated pulse, said modulated pulse having an intensity greater than the intensity of said unmodulated pulse, said modulated pulse having a pulse width less than the pulse width of said unmodulated pulse; and
   (e) milling the cavity portion of the hole utilizing a mechanical milling tool.

26. A method for producing a shaped hole in a structure comprising the steps of:
   (a) mechanically drilling a cavity in a structure;
   (b) emitting a pulsed laser beam from a laser system and focusing said pulsed laser beam at a focal point such that said pulsed laser beam passes through at least a portion of said cavity within said structure, said pulsed laser beam penetrating through said structure, thereby forming a shaped hole within said structure; and
   (c) milling the cavity portion of the shaped hole.

27. The method of claim 26 wherein said pulsed laser beam is a modulated pulsed laser beam.

28. The method of claim 26 wherein said pulsed laser beam is an unmodulated laser beam.

29. The method of claim 28 further comprising the step of emitting a modulated pulsed laser beam from said laser system and focusing said modulated pulsed laser beam at said focal point and the same location that said pulsed laser beam that penetrated through said structure.

30. The method of claim 26 wherein said structure is an airfoil.

31. The method of claim 26 wherein the step of milling the cavity portion of the shaped hole comprises utilizing a mechanical milling tool.

32. The method of claim 31 wherein said mechanical milling tool is a ball milling device.

* * * * *